US006972737B2

(12) United States Patent
Furukawa et al.

(10) Patent No.: US 6,972,737 B2
(45) Date of Patent: Dec. 6, 2005

(54) IMAGE DISPLAY APPARATUS

(75) Inventors: Yukio Furukawa, Kanagawa (JP); Hajime Sakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 10/152,683

(22) Filed: May 23, 2002

(65) Prior Publication Data

US 2002/0196377 A1 Dec. 26, 2002

(30) Foreign Application Priority Data

May 28, 2001 (JP) ............................. 2001-159187

(51) Int. Cl.[7] .............................................. G09G 3/00
(52) U.S. Cl. .................................... 345/32; 353/31
(58) Field of Search .............. 345/32, 7–9; 353/30–37, 353/94

(56) References Cited

U.S. PATENT DOCUMENTS

| 3,864,730 A | * | 2/1975 | Roth .......................... 348/750 |
| 5,467,104 A | * | 11/1995 | Furness et al. ................. 345/8 |
| 6,020,937 A | * | 2/2000 | Bardmesser ................ 348/756 |
| 6,508,554 B2 | * | 1/2003 | Hatakeyama et al. ......... 353/31 |

FOREIGN PATENT DOCUMENTS

JP 9-134135 5/1997

OTHER PUBLICATIONS

N. Asada, "Silicon Micro Optical Scanner", Microoptics Group Organ, The Japan Society of Applied Physics, vol. 14, No. 3, pp. 13-17.
N. Asada, "Silicon Micro Optical Scanner" (English-language version), Microoptics Group Organ, The Japan Society of Applied Physics, vol. 14, No. 3, pp. 13-17.

* cited by examiner

Primary Examiner—Alexander Eisen
(74) Attorney, Agent, or Firm—Fitzpatrick, Cella, Harper & Scinto

(57) ABSTRACT

An image display apparatus includes a light source having a plurality of light emitting devices, and a projection optical system capable of making lights from the light source scan in a main scanning direction and in a subscanning direction to display on a screen an image having a predetermined number of pixels. The scanning lines in the main scanning direction are formed by the lights emitted from each of the light emitting devices and controlled to be superposed one on another on the screen.

1 Claim, 9 Drawing Sheets

IMAGE DISPLAY APPARATUS

BACKGROUND OF THE INVENTION

1. Field of the Invention

The present invention relates to an image display apparatus for displaying an image on a screen such as a television screen or computer screen.

2. Related Background Art

Projection-type laser image display apparatuses have been widely provided which display an image such as a television image by modulating laser beams of three colors: red, green, and blue, and by scanning the laser beams in a horizontal direction and in a vertical direction.

FIG. 1 is a diagram schematically showing a configuration of a laser image display apparatus such as the one disclosed in Japanese Patent Application Laid-open No. 9-134135. In FIG. 1, there are illustrated an image information source 1, an image controller 2, laser oscillators 11, 14, and 17 which generate red laser light, laser oscillators 12, 15, and 18 which generate green laser light, laser oscillators 13, 16, and 19 which generate blue laser light, beams of laser light 61 to 69 generated by the laser oscillators 11 to 19, modulators 21 to 29 which amplitude-modulate laser beams 61 to 69, beam-combining optical systems 31 to 33 each of which combines three laser beams respectively having the three colors on one optical axis, laser beams 71 to 73 amplitude-modulated and three-color-combined, horizontal scanning devices 41 to 43, collimator/condenser lenses 111 to 113 which collimate the horizontally scanning laser beams and condense the collimated beams on vertical scanning devices 51 to 53, the vertical scanning devices 51 to 53, projection lenses 121 to 123, and a screen 110. A vertical scanning signal is indicated by 131 and a horizontal scanning signal is indicated by 132.

The first stage of the arrangement shown in the uppermost section of FIG. 1 will be described. Red, green and blue light beams are produced by the laser oscillators 11 to 13, are amplitude-modulated by the modulators 21 to 23, and are thereafter combined on one optical axis. The combined laser beam is made to scan two-dimensionally by the horizontal scanning device 41 and the vertical scanning device 51 to project an image on the screen 110. The same operation is performed in each of the second and third stages.

In the above-described arrangement, an image is divided into three modulators (e.g., modulators 21 to 23), and one horizontal scanning device (e.g., device 41) is provided with respect to each divided image. Therefore, ⅓ of the ordinary frequency range and ⅓ of the ordinary scanning frequency suffice as the frequency range of these modulators (e.g., modulators 21 to 23) and the scanning frequency of the horizontal scanning device (e.g., device 41). This means that a high resolution image can be formed.

The conventional art presupposes use of a laser oscillator having a sufficiently high optical output level and lacks consideration of replacement of such a light source with a semiconductor laser or an LED of a lower optical output level. For example, light emitting diodes (LEDs) having an optical output of about several milliwatts may be used as light sources. Since the LEDs can be directly modulated, there is no need for external modulators (e.g., modulators 21 to 23).

However, ten or more LEDs are required with respect to each of red, green and blue to avoid a deficiency of screen brightness. In the case of the arrangement shown in FIG. 1, ten or more groups of light sources and scanning devices are required if LEDs are used as the light sources. It is not realistic to use LEDs in the conventional art.

Also, gradation of a certain color, e.g., red, depends on the performance of an external modulator (e.g., modulator 21). On the other hand, in a case where an LED is used as a light source, gradation depends on the modulation frequency at which the LED is directly modulated (by pulse-width modulation or amplitude modulation), and it is difficult to increase gradation steps since the LED is not suitable for high-speed modulation.

In a case where LEDs of one color, e.g., red, are substituted for the lasers 11 to 13 in the arrangement shown in FIG. 1, a loss of ⅓ is necessarily caused even if the beam-combining optical system 31 is suitably formed. In this case, use of an increased number of LEDs is not effective, and it is not possible to avoid a deficiency of screen brightness.

SUMMARY OF THE INVENTION

An object of the present invention is to provide a multipurpose image display apparatus capable of displaying an image having a suitable number of gradation steps with sufficiently high screen brightness even if a light source such as a semiconductor laser or an LED of a comparatively low optical output level is used.

To attaint the above-described object, according to an aspect of the present invention, there is provided an image display apparatus having a light source having a plurality of light emitting devices, and making lights from the light source scan in a main scanning direction and in a subscanning direction to display on a screen an image having a predetermined number of pixels, wherein scanning lines in the main scanning direction formed by the lights emitted from each of the light emitting devices are controlled to be superposed one on another on the screen.

In the above image display apparatus, the lights from the light emitting devices may be irradiated on the same point on the screen simultaneously or at different times with a certain time lag.

In the above image display apparatus, the light emitting devices may be arranged unidimensionally or two-dimensionally.

In the above image display apparatus, the light emitting devices may be arranged in a direction corresponding to main scanning.

In the above image display apparatus, the light emitting devices may be arranged in a direction corresponding to subscanning while being spaced apart from each other by a distance determined on the basis of a pixel pitch in the subscanning direction.

In the above image display apparatus, the light emitting devices may be arranged in a direction not parallel to each of a direction corresponding to main scanning and a direction corresponding to subscanning, and the distance between the light emitting devices in the direction corresponding to subscanning may be equal to a distance determined on the basis of a pixel pitch in the subscanning direction.

In the above image display apparatus, each of the light emitting devices may be designed so as to have an optical output of any of multivalue intensities.

In the above image display apparatus, each of the light emitting devices may output different quantities of light by modulating at least one of a pulse width and an amplitude.

In the above image display apparatus, the plurality of light emitting devices in the light source may be separated into a certain number of light emitting device groups respectively outputting lights with which different image areas on the screen are irradiated. The light emitting device groups may be arranged in a direction corresponding to subscanning or in a direction corresponding to main scanning while being spaced apart from each other by a distance determined on the basis of a pixel pitch in the main scanning direction or the subscanning direction. Further, the light emitting devices in each of the light emitting device groups may be arranged in a direction corresponding to subscanning while being spaced apart from each other by a distance determined on the basis of a pixel pitch in the subscanning direction.

In the above image display apparatus, the light source may have light emitting devices capable of emitting red light, green light, and blue light.

In the above image display apparatus, the lights from the emitting devices may be substantially uniform in color.

The above image display apparatus may further comprise scanning means in which a scanning frequency and a scanning angle in the main scanning direction or the subscanning direction are controlled in such a manner that the light emitting devices in the light source are arranged in predetermined array while being spaced apart from each other by a distance determined on the basis of a pixel pitch in the main scanning direction or the subscanning direction. The scanning means may comprise a galvanometer mirror or a rotating polygon mirror.

In the above image display apparatus, each of the light emitting devices may be a laser, a light emitting diode or a super-luminescent diode.

DESCRIPTION OF THE PREFERRED EMBODIMENTS

Embodiments of the present invention will be described with reference to the accompanying drawings.

In this specification, scanning at a higher speed in one direction is defined as main scanning, while scanning at a lower speed in another direction is defined as subscanning. Since in ordinary cases horizontal scanning is performed at higher speed, main scanning and subscanning are assumed to be a scanning in a horizontal direction and vertical scanning, respectively, in the following description. Needless to say, image display can be performed even if the relationship between main scanning and subscanning is reversed with respect to the scanning direction.

(Embodiment 1)

Figure 1:
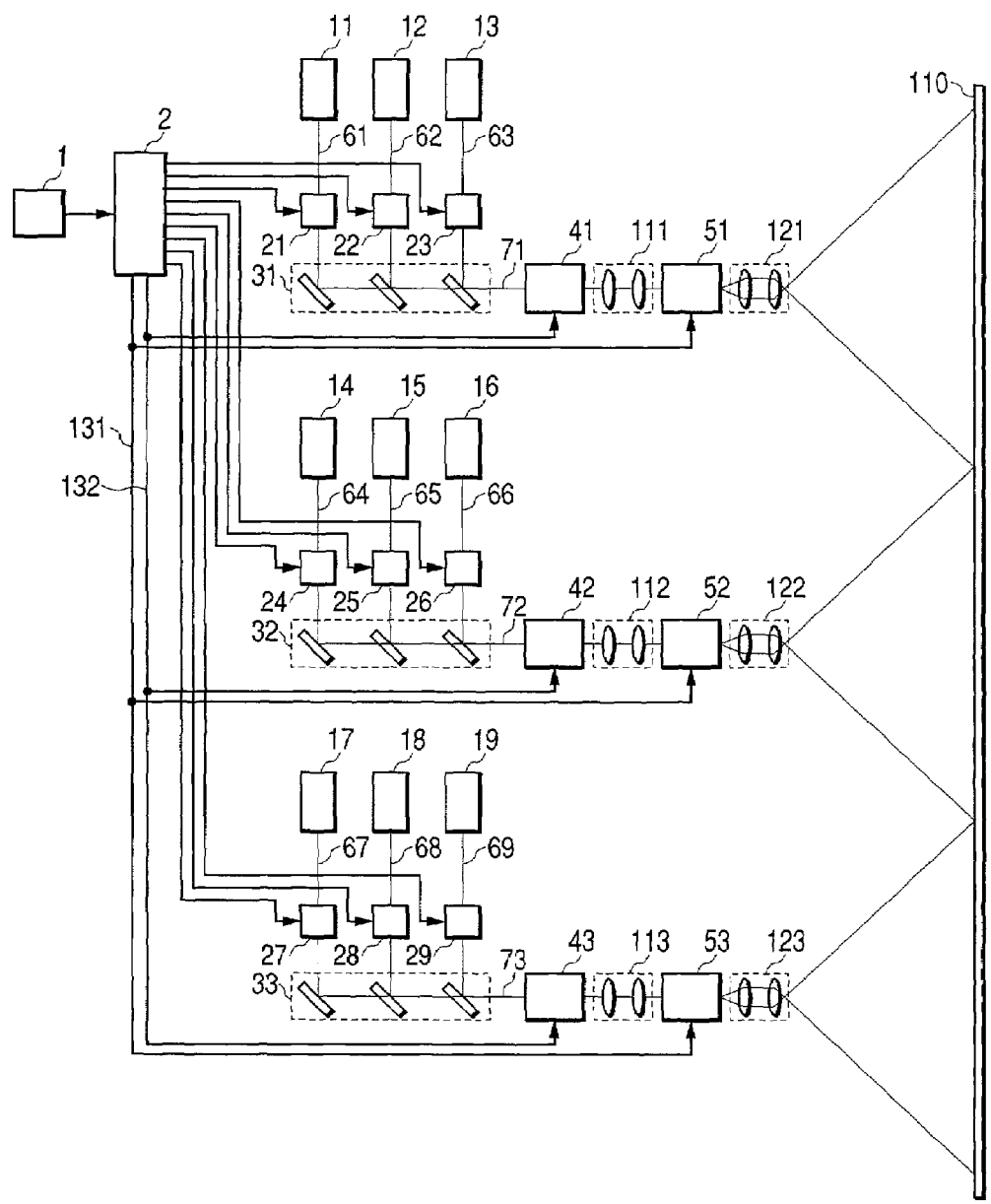
FIG. 1 is a diagram schematically showing a configuration of a conventional laser image display apparatus.
Figure 2A:
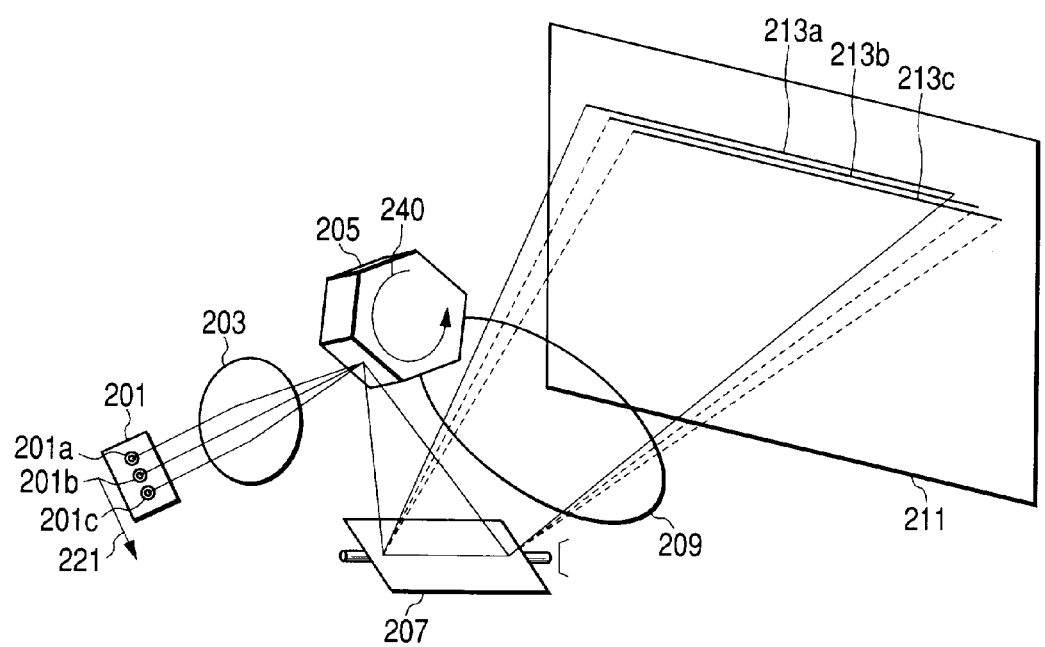
FIG. 2A is a diagram schematically showing an image display apparatus which represents a first embodiment of the present invention.
Figure 2B:
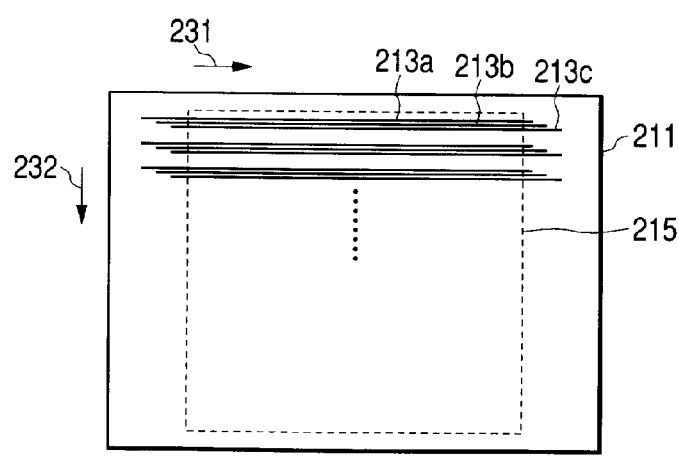
FIG. 2B is an enlarged diagram of a screen shown in FIG. 2A.

FIG. 2A is a diagram schematically showing a configuration of an image display apparatus which represents a first embodiment of the present invention. FIG. 2B is an enlarged diagram of a screen shown in FIG. 2A.

In FIG. 2A are illustrated red semiconductor lasers 201a to 201c, a light source 201 having the semiconductor lasers 201a to 201c, a collimator lens 203, a rotating polygon mirror 205 provided as a horizontal scanning (main scanning) device, a galvanometer mirror 207 provided as a vertical scanning (subscanning) device, a projection lens 209, and a screen 211.

For example, three red semiconductor lasers 201a to 201c having an optical output of about 30 mW are arranged in the light source 201 at intervals of 100 μm in a direction 221 corresponding to horizontal scanning.

The direction corresponding to horizontal scanning is a direction enabling projection of beams from the light source 201 such that when the beams are made to scan in a horizontal directions, scanning lines 213a to 213c formed on the screen 211 are superposed one on another.

The size of an image area 215 on the screen is assumed to be 14 inches (284 mm in width and 213 mm in height). To display an image, for example, in Video Graphic Array (VGA) format (having a horizontal resolution of 640 pixels and a vertical resolution of 480 pixels) in the image area 215, the number of mirror faces and the rotating speed of the rotating polygon mirror 205 are set such that the scanning frequency is about 30 kHz. In FIG. 2A, an arrow 240 indicates a direction of rotation of the mirror 205.

The galvanometer mirror 209 is driven with a sawtooth wave at a frequency of about 60 Hz. The galvanometer used in this embodiment is operated at a comparatively low speed and may be selected from ordinary ones on the market using a machine-wound drive coil unlike one formed by a semiconductor process and used in a third embodiment described below.

The power of the entire projection optical system including the projection lens 209 is assumed to be 10.

If the above-mentioned scanning frequency is set, the number of scanning lines formed from one semiconductor laser device is 500 per frame, and 480 lines among them are used for actual image formation.

The screen 211 is not limited to a particular type. A specially designed screen may be used or images may be projected onto a wall or a ceiling.

When the light beams are made to scan horizontally by using the image display apparatus shown in FIG. 2A, scanning lines 213a to 213c are formed on the screen 211 by the light beams from the red semiconductor lasers 201a to 201c.

Since the red semiconductor lasers 201a to 201c are arranged in the direction corresponding to horizontal scanning, the scanning lines 213a to 213c are superposed on a straight line on the screen 211. However, the scanning lines 213a to 213c are shifted one from another in the horizontal direction by 2 mm corresponding to the product of the power and the interval between the red semiconductor lasers 201a to 201c.

Therefore, for compensation for this shift, signals are applied to the red semiconductor lasers 201a to 201c with relative time lags set by considering the horizontal shifts of the scanning lines to effect multiple projection to predetermined points (pixels), thus enabling control of the luminance of pixels.

In this embodiment, each of the red semiconductor lasers 201a to 201c is pulse-width-modulated or amplitude-modulated, for example.

Figure 3:
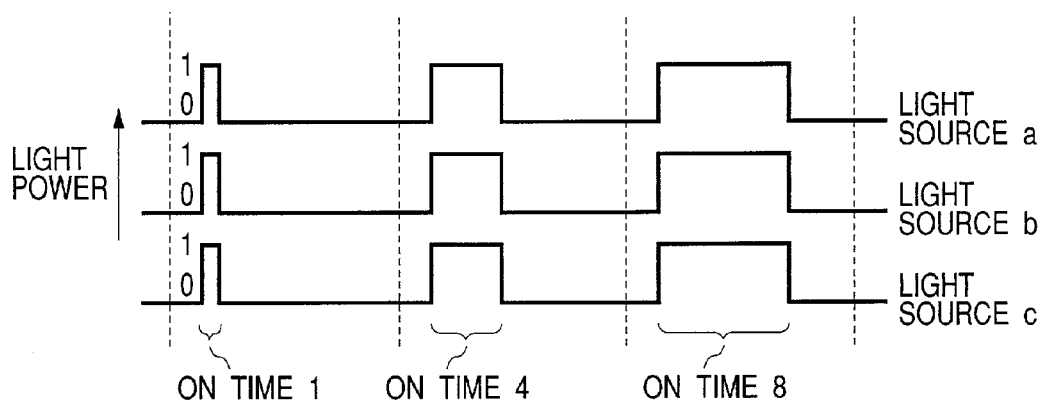
FIG. 3 is a diagram showing pulse waveforms when red semiconductor lasers 201a to 201c shown in FIG. 2A are pulse-width-modulated.

FIG. 3 is a diagram showing pulse waveforms when, for example, three light emitting devices (light sources a to c, corresponding to the semiconductor lasers 201a to 201c in FIG. 2A) are pulse-width-modulated. The ordinate represents light power. In actuality, the light beams pass the position of one pixel at different times since the light beams from the three light emitting devices are projected to different positions on the screen. However, the relationship between the beams is expressed by ignoring the time differences for ease of description. The pulse width is modulated on every pixel, as shown in the diagram, thus achieving expression of multivalue gradation for a high-resolution image. Pulse-width modulation needs to be performed at a high frequency and is therefore suitable for use with a semiconductor laser.

Figure 4:
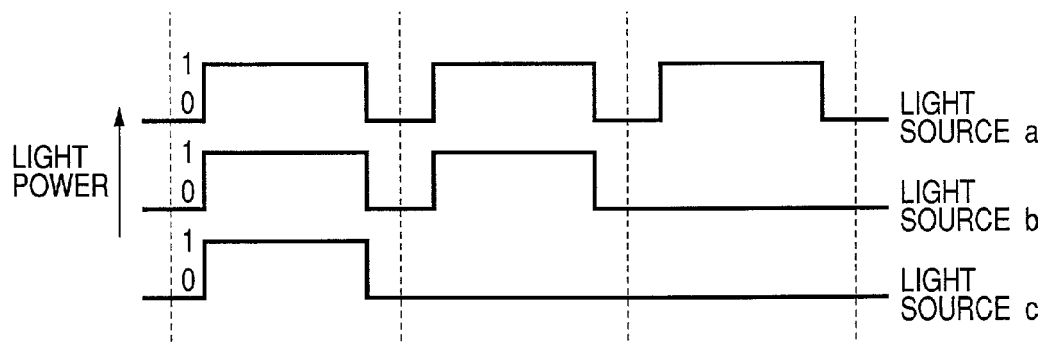
FIG. 4 is a diagram showing pulse waveforms, for example, when three LEDs are ON/OFF-modulated.

FIG. 4 is a diagram showing pulse waveforms when, for example, three light emitting devices (light sources a to c) are modulated by binary (ON/OFF) switching. The ordinate represents light power. Also in this case the waveforms are shown by ignoring the time differences. In this case, the number of gradations steps is the number of light sources+1 (including zero luminance). The number of gradation steps is reduced in comparison with that in the case of modulation such as shown in FIG. 3, but a comparatively low modulation frequency suffices. Therefore, this method is suitable for use with LEDs.

Figure 5:
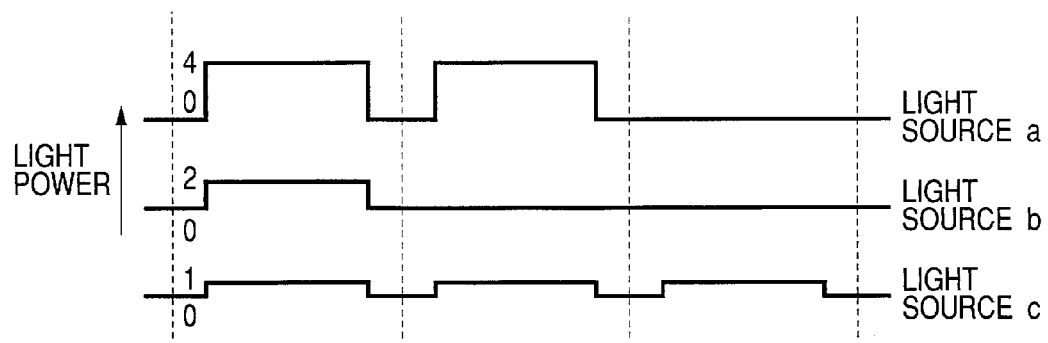
FIG. 5 is a diagram showing pulse waveforms, for example, when three LEDs different from those relating to FIG. 3 are ON/OFF-modulated; relating to FIG. 3 are ON/OFF-modulated.

Further, the optical outputs of, for example, three light emitting devices (light sources a to c) may be set to different levels in advance, as shown in FIG. 5. Also in FIG. 5, the waveforms are shown by ignoring the time differences. The optical outputs of the light emitting elements set to three levels "1", "2", and "4", for example. If the outputs are set to such levels that the optical output proportions correspond to the factorial of 2 as in this case, the number of gradations expressible is maximized and the number of gradations in this case is the number determined by multiplying 2 by itself the number of times corresponding to the number of light sources (including zero luminance). Thus, the number of gradations can be increased in comparison with the method shown in FIG. 4.

One of the methods shown in FIGS. 3, 4, and 5 may be selected according to one's use.

Thus, signals are modulated with respect to the pulse width or amplitude to enable gradational expression and to thereby display a high-resolution image.

And, as shown in FIG. 2B, vertical scanning with the scanning lines 213a to 213c with a pixel pitch (213 mm/480=0.44 mm) set in the vertical direction is performed to form an image. In FIGS. 2A, and 2B, the three scanning lines 213a to 213c are shown in a state of being slightly shifted one from another in a vertical scanning direction 232 for ease of explanation. However, the scanning lines coincide with each other in the vertical scanning direction.

Some area where no image can be displayed exists on the screen 211 due to the shift of the scanning lines 213a to 213c in the horizontal scanning direction 231. In this embodiment, when an image is actually displayed on the screen 211 within the image displayable area 215, the screen brightness is about 100 cd/m$^2$. Thus, an image in VGA format can be displayed so as to be easily seen in an ordinarily lighted room.

In this embodiment, the number of red semiconductor lasers 201a to 201c may be increased and the distance therebetween may be changed. In particular, if the distance is excessively reduced, interference between the semiconductor lasers may influence modulation or a high degree of manufacturing processing accuracy may be required. If the distance is excessively large, the number of product laser devices per laser wafer area is reduced to cause a reduction in yield. The distance between the lasers may be optimized by considering these conditions.

A light emitting diode (LED) or super-luminescent diode (SLD) may be used instead of the red semiconductor laser. Further, the power of the optical system and the lens configuration may be changed.

(Embodiment 2)

Figure 6A:
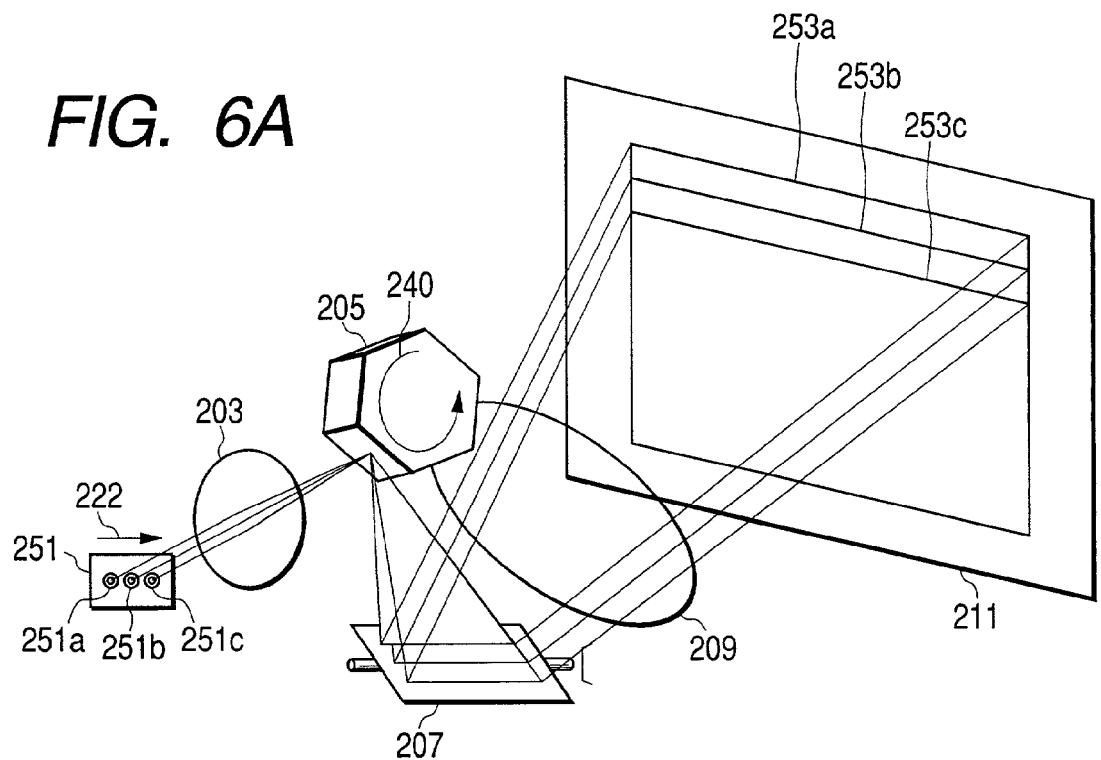
FIG. 6A is a diagram schematically showing an image display apparatus which represents a second embodiment of the present invention.
Figure 6B:
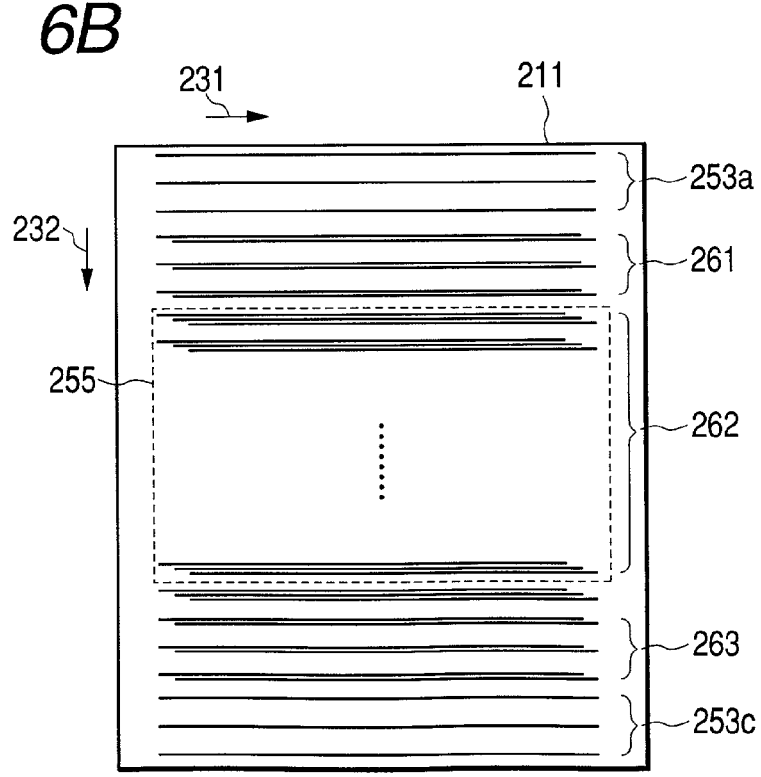
FIG. 6B is an enlarged diagram of a screen shown in FIG. 6A.

FIG. 6A is a diagram schematically showing the configuration of an image display apparatus which represents a second embodiment of the present invention. This image display apparatus uses a light source 251 in which semiconductor lasers 251a to 251c are arranged in a direction 222 corresponding to vertical scanning (a direction perpendicular to the direction corresponding to horizontal scanning in Embodiment 1) unlike those shown in FIG. 2A. In FIG. 6A, components corresponding to those shown in FIG. 2A are indicated by the same reference characters. FIG. 6B is an enlarged diagram of the screen shown in FIG. 6A.

The size and resolution of an image formed on the screen and the modulation frequency at each scanning device are the same as those in Embodiment 1.

The distance between the semiconductor lasers 251a to 251c is assumed to be an integer multiple of a value obtained by dividing the pixel pitch (213 mm/480=0.44 mm) in the vertical direction of an image formed on the screen 211 by the power (e.g., 10) of the projection optical system. In this embodiment, the distance is set to 132 µm obtained by multiplying the result of this division by 3.

Because the semiconductor lasers 251a to 251c are arranged in this manner, the i-th one from the top in scanning lines 253a, the (i−3)th one from the top in scanning lines 253b, and the (i−6)th one from the top in scanning lines 253c coincide with each other when vertical scanning with each of the scanning lines with pixel pitch in the vertical-direction is performed. The 480 scanning lines each formed by three of the above-described scanning lines coinciding with each other are used to enable display of an image in VGA format in an image area 255. A modulation method used in this embodiment may be selected from various methods such as those described above with respect to Embodiment 1. In FIG. 6B, the group of scanning lines consisting of scanning lines 253a and 253b is denoted by 261; the group of scanning lines consisting of scanning lines 253a, 253b and 253c is denoted by 262; and the group of scanning lines consisting of scanning lines 253b and 253c is denoted by 263.

In this embodiment, distance between the semiconductor lasers may be any of possible values determined as integer multiples of the value obtained by dividing the pixel pitch by the power of the projection optical system. It may be selected by considering interference between the semiconductor lasers, the manufacturing process, yield, etc.

Figure 7:
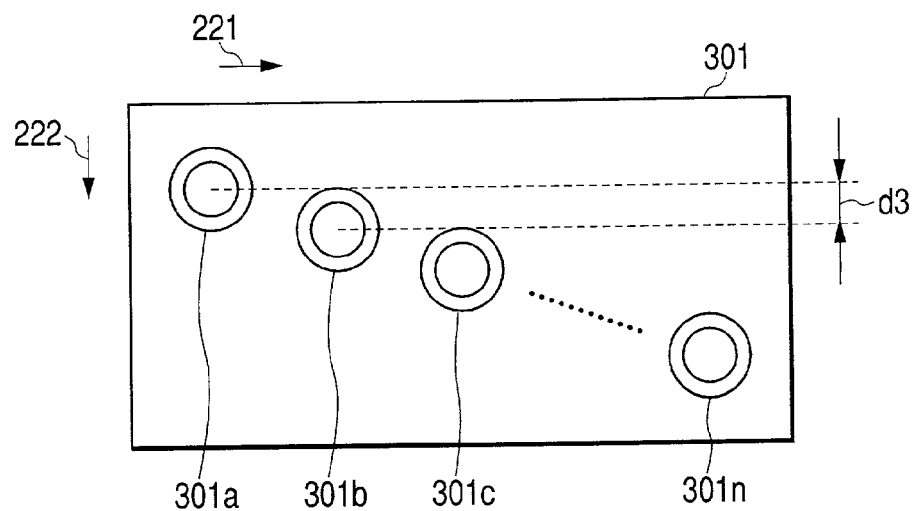
FIG. 7 is a diagram showing an example of modification of the light source shown in FIG. 6A.

Further, a light source 301 such as shown in FIG. 7 may be used in which semiconductor lasers 301a to 301n are arranged in a direction inclined at a predetermined angle from the horizontal scanning direction. Also in this case, the semiconductor lasers 301a, 301b and so on may be arranged while being inclined so that distance d3 thereof in the direction corresponding to vertical scanning is an integer multiple of the value obtained by dividing the pixel pitch by the power of the projection optical system. Thus, the distance between the semiconductor lasers can be freely selected with a high degree of design freedom.

Further, light emitting devices such as semiconductor lasers or LEDs may be arranged in a two-dimensional array, and horizontal scanning and vertical scanning may be performed so that all the scanning lines therefrom are superposed with suitable time lags.

(Embodiment 3)

Figure 8:
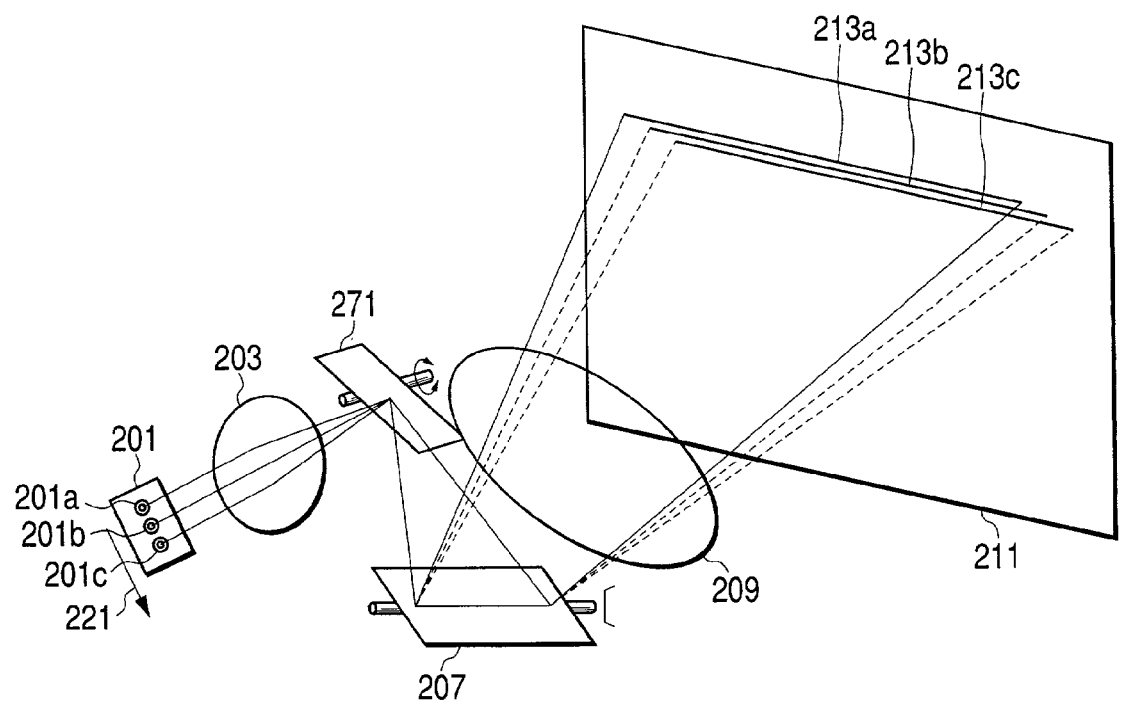
FIG. 8 is a diagram schematically showing an image display apparatus which represents a third embodiment of the present invention.

FIG. 8 is a diagram schematically showing a configuration of an image display apparatus which represents a third embodiment of the present invention. This image display apparatus uses as a horizontal scanning device a galvanometer mirror 271 having micromirrors formed by a semiconductor process or the like, which is different from FIG. 2A.

Such a micromirror is described, for example, in a publication "Silicon Microopitcal Scanner" pp 13–17, No. 3, Vol. 14, Microoptics group organ, The Japan Society of Applied Physics.

Such a micromirror is suitable for reducing the overall size, weight, and power consumption of the display apparatus, and is capable of high-speed oscillation at several ten kilohertz.

In this embodiment, the size, weight, price, and power consumption of the image display apparatus can be reduced in comparison with that using the rotating polygon mirror 205 shown in FIG. 2A, or the like.

(Embodiment 4)

Figure 9A:
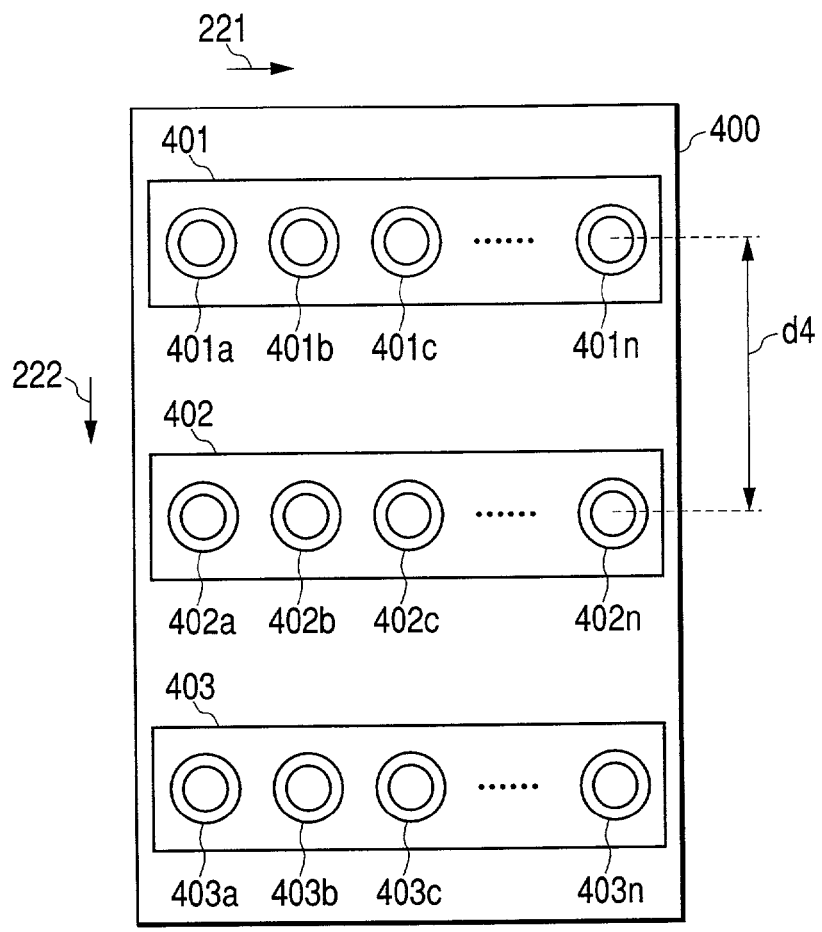
FIG. 9A is a diagram schematically showing an image display apparatus which represents a fourth embodiment of the present invention.
Figure 9B:
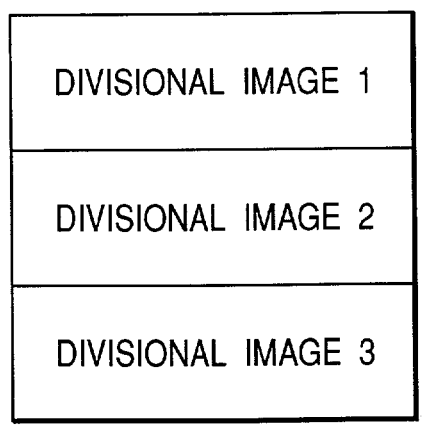
FIG. 9B is an enlarged diagram of a screen shown in FIG. 9A.

FIG. 9A is a diagram schematically showing a configuration of an image display apparatus which represents a fourth embodiment of the present invention. FIG. 9B is a schematic diagram showing a relationship between a light source shown in FIG. 9A and a screen. A light source 400 in which surface-type LEDs, surface emitting lasers, or the like are two-dimensionally arranged is shown as a light source in this embodiment.

The light source 400 has LED groups 401 to 403 consisting of n number of LEDs 401a to 401n, n number of LEDs 402a to 402n, and n number of LEDs 403a to 403n, respectively. In this embodiment, an ON/OFF method such as that shown in FIG. 4 is used as a modulation method for the light source 400. If such LEDs are used, the need for external optical modulators is eliminated.

Divisional images 1 to 3 shown in FIG. 9B are respectively displayed by the LED groups 401 to 403.

The distance d4 between the LED groups 401, 402, and 403 is set to 7.1 mm, i.e., ⅓ of the value obtained by dividing the entire pixel area width (e.g., 213 mm) in the vertical scanning direction on the screen by the power of the projection optical system (e.g., 10).

The distance between the LEDs 401a, 401b, and so on in the LED groups 401 to 403 is set to 50 µm, for example. The optical output of the LEDs 401a and so on is set to about 3 mW.

The arrangement of the optical devices other than the light source, etc., are the same as those shown in FIG. 2A, and the plurality of scanning lines from the LEDs for each divisional image are superposed in the same manner as those in Embodiment 1.

Vertical scanning with the plurality of scanning lines with the pixel pitch in the vertical direction is performed by using the light source 400 shown in FIG. 9A to form an image. The display apparatus of this embodiment has the following advantages in comparison with those shown in FIG. 2A and so on.

(1) Since ⅓ of the ordinary modulation frequency suffices as the modulation frequency of the light source 400, the LEDs not easy to modulate at a high speed can be easily modulated. Further, since the time assigned to each LED with respect to each of pixels forming an image is increased, the optical output for obtaining substantially the same screen brightness can be reduced.

(2) The scanning frequency of the horizontal scanning device can be reduced to ⅓.

(3) The scanning angle of the vertical scanning device can be reduced to ⅓. This means that a galvanometer mirror having a smaller scanning angle may be used or a galvanometer mirror having the same scanning angle as that shown in FIG. 2A but unsatisfactory in time-angle linearity when driven with a sawtooth wave may be used with respect to a time zone with higher linearity, thus enabling use of a galvanometer mirror advantageous in terms of cost.

The number of LEDs 401a and so on and the number of LED groups 401 and so on are not limited to those in the above-described example. These numbers may be freely set provided that, with respect to the number N corresponding to the number of divisional images and the number of LED groups, the distance d4 is 1/N of the value obtained by dividing the image area width in the vertical scanning direction on the screen by the power of the projection optical system. The modulation frequencies and the scanning angles of the horizontal scanning device and the vertical scanning device may be suitably set according to the number of LEDs and the number of LED groups.

(Embodiment 5)

Figure 10A:
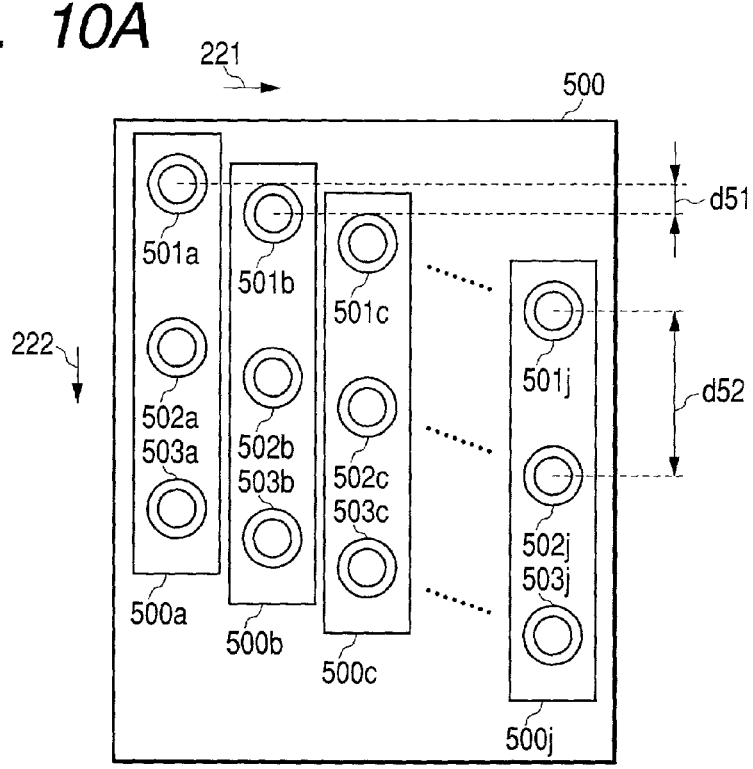
FIG. 10A is a diagram schematically showing an image display apparatus which represents a fifth embodiment of the present invention.
Figure 10B:
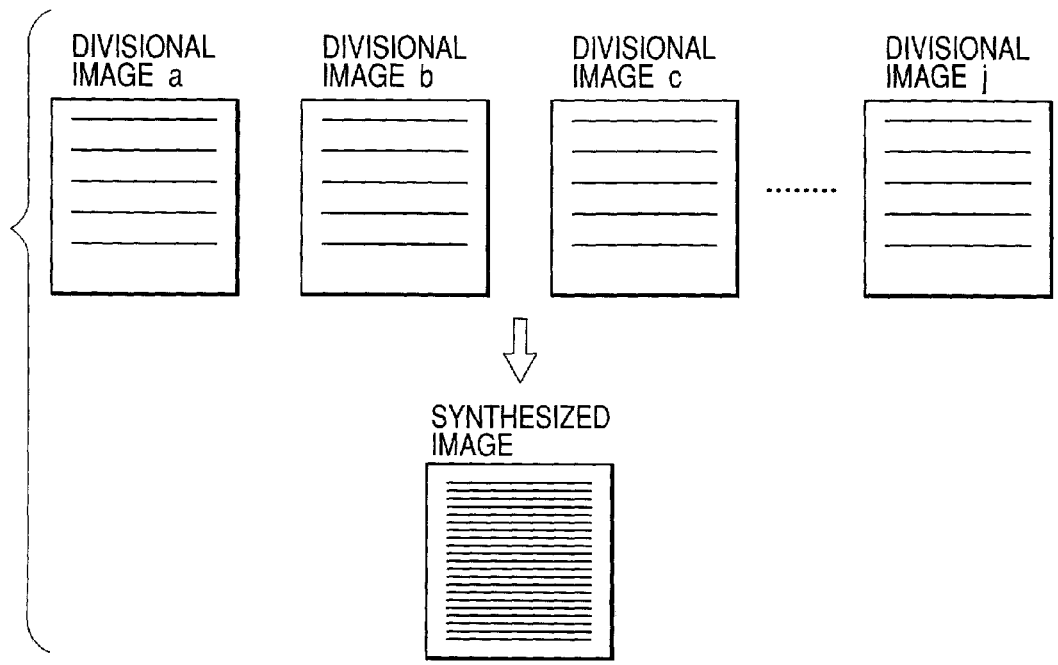
FIG. 10B is a diagram showing a relationship between a light source and a screen shown in FIG. 10A.

FIG. 10A is a diagram schematically showing a configuration of an image display apparatus which represents a fifth embodiment of the present invention. FIG. 10B is a schematic diagram showing a relationship between a light source shown in FIG. 10A and a screen.

Referring to FIG. 10A, a light source 500 is formed in such a manner that a plurality of unidimensional laser arrays 301 each having a semiconductor lasers 301a and so on such as those shown in FIG. 7 are combined to form a two-dimensional array, and LEDs or surface emitting laser arrays or the like are substituted for the semiconductor lasers 301a and so on.

FIG. 10A shows an example of the light source 500 having 10 LED groups 500a to 500j. For example, the LED group 500a consists of three LEDs 501a, 502a, and 503a. A pulse-width modulation is used as a modulation method for the light source 500.

As shown in FIG. 10A, the LED groups 500a to 500j respectively form divisional images a to j, which are combined to form a synthesized image.

The distance d51 between each adjacent pair of the LED groups in the direction corresponding to vertical scanning is set to 44 μm, i.e., the value obtained by dividing the pixel pitch (e.g., 0.44 mm) in the vertical direction on the screen by the power of the projection optical system (e.g., 10). The distance between each adjacent pair of the LED groups in the horizontal direction corresponding to horizontal scanning 401 is set to 50 μm, for example.

Also, the distance d52 between the LEDs in each LED group is set to 440 μm ten times larger than the value obtained by dividing the pixel pitch (e.g., 0.44 mm) in the vertical direction on the screen by the power of the projection optical system (e.g., 10).

In this embodiment, the optical output of the LEDs 501a and so on is set to about 3 mW. Further, the scanning frequency in the horizontal scanning direction is 1/10 of that in the arrangement shown in FIG. 6A. Vertical scanning with the plurality of scanning lines with a pitch ten times larger than the pixel pitch in the vertical direction is performed, so that the scanning lines formed by the plurality of LEDs in one of the LED groups (e.g., LEDs 501a to 503a) are superposed.

If the light source 500 shown in FIG. 10A is used, the modulation frequency of the light source 500 and the scanning frequency of the horizontal scanning device can be reduced to 1/10 of those in the arrangement shown in FIG. 6A. Accordingly, direct modulation of the LEDs 501a and so on can be easily performed and pulse width modulation can also be performed. Also, the optical output of the LED can also be limited.

In this embodiment, the number of LEDs 501a and so on and the number of LED groups 500a and so on are not limited to the above-mentioned examples. Preferably, with respect to the number N of divisional images, the distance d51 is set to the value obtained by dividing the pixel pitch in the vertical direction on the screen by the power of the projection optical system, or aN+b times larger than this value (a: an integer equal to or larger than 1; b: an integer equal to or larger than 1 and smaller than N), and the distance d52 is set N times larger than the value obtained by dividing the pixel pitch in the vertical direction on the screen by the power of the projection optical system, or to an integer multiple of this value. In this case, the scanning frequency of the horizontal scanning device may be reduced to 1/N of those in the arrangement shown in FIG. 6A.

(Embodiment 6)

Figure 11A:
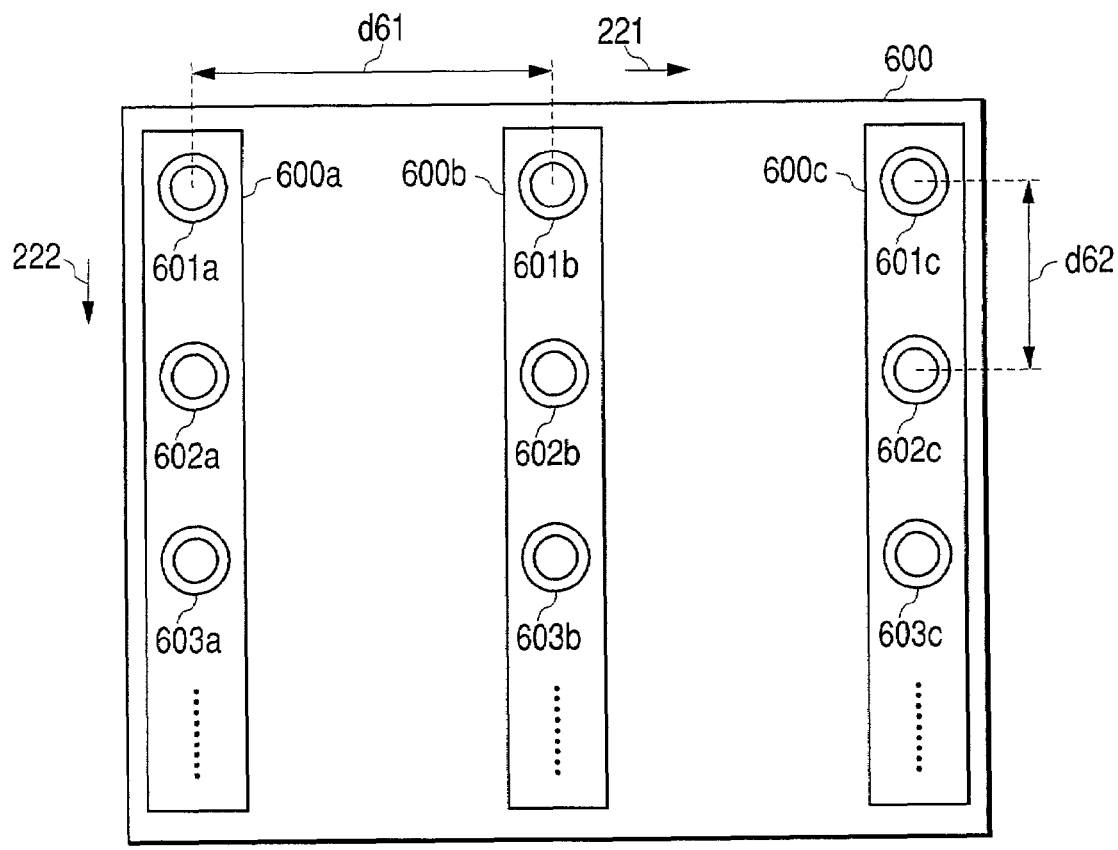
FIG. 11A is a diagram schematically showing an image display apparatus which represents a sixth embodiment of the present invention.
Figure 11B:
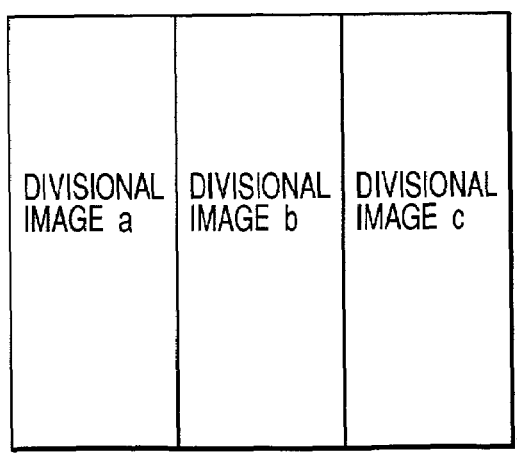
FIG. 11B is a diagram showing a relationship between a light source and a screen shown in FIG. 11A.

FIG. 11A is a diagram schematically showing a configuration of an image display apparatus which represents a sixth embodiment of the present invention. FIG. 11B is a schematic diagram showing a relationship between a light source shown in FIG. 11A and a screen.

Referring to FIG. 11A, a light source 600 is formed in such a manner that a plurality of unidimensional laser arrays 301 each having a semiconductor lasers 301a and so on such as those shown in FIG. 7 are combined to form a two-dimensional array, and LEDs or surface emitting laser arrays or the like are substituted for the semiconductor lasers 301a and so on.

The light source 600 has LED groups 600a to 600c each having n LEDs, e.g., LEDs 601a, 602a, 603a, and so on. A pulse-width modulation is used as a modulation method for the light source 600. Each of the LED groups 600a to 600c has about 10 LEDs.

As shown in FIG. 11B, the LED groups 600a to 600c respectively form divisional images a, b, and c.

The distance d62 between the LED 601c, 602c and so on is set to 88 μm twice as large as the value obtained by dividing the pixel pitch (e.g., 0.44 mm) in the vertical direction on the screen by the power of the projection optical system (e.g., 10).

The distance d61 between the LED groups, 600a, 600b, and 600c is set to 9.5 mm, i.e. ,1/3 of the value obtained by dividing the entire pixel area width (e.g., 284 mm) in the horizontal scanning direction on the screen by the power of the projection optical system (e.g., 10). The optical output of the LEDs 601a and so on is set to about 3 mW.

Vertical scanning with the plurality of scanning lines with the pixel pitch in the vertical direction can be performed by using the light source 600 shown in FIG. 11A to form an image. The modulation frequency of the light source 600 and the scanning angle of the horizontal scanning device can be reduced to 1/3 of those in the arrangement shown in FIG. 6A.

In this embodiment, the number of LEDs 601a and so on and the number of LED groups 600a to 600c are not limited to the above-mentioned examples. Preferably, with respect to the number N corresponding to the number of divisional images and the number of LED groups, the distance d61 between the LED groups 600a, 600b, and 600c is set to 1/N of the value obtained by dividing the image area width in the horizontal scanning direction on the screen by the power of the projection optical system, and the distance d62 between the LEDs 601c, 602c and so on is set to the value obtained by dividing the pixel pitch in the vertical direction on the screen by the power of the projection optical system, or to an integer multiple of this value.

(Embodiment 7)

Figure 12:
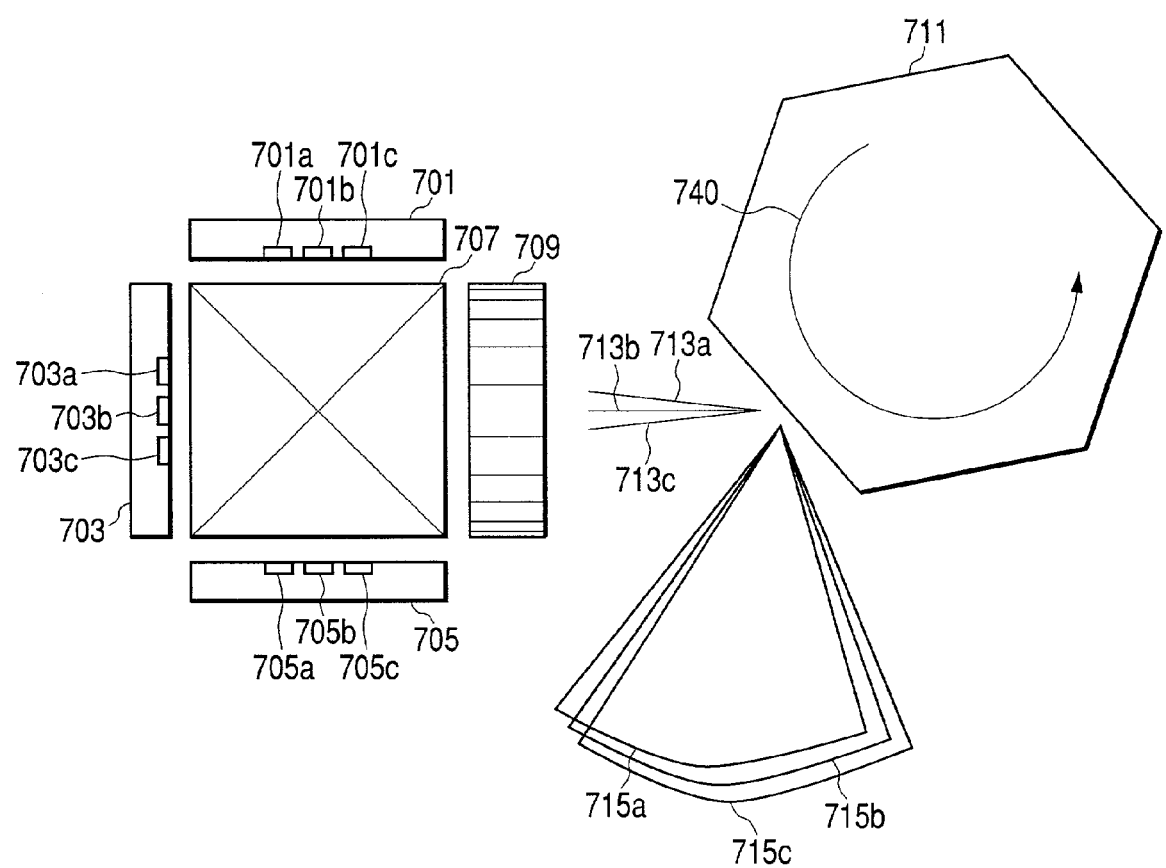
FIG. 12 is a diagram schematically showing a configuration of an optical system of an image display apparatus which represents a seventh embodiment of the present invention.

FIG. 12 is a diagram schematically showing a configuration of an image display apparatus which represents a seventh embodiment of the present invention. In FIG. 12, there are illustrated a red LED array 701 having red LEDs 701a to 701c, a green LED array 703 having green LEDs 703a to 703c, a blue LED array 705 having blue LEDs 705a to 705c, a combining optical system 707 constituted by a dichroic mirror or the like, a collimator lens 709, and a horizontal scanning device 711. The direction of rotation of the horizontal scanning device 711 is indicated by 740.

Light from the horizontal scanning device 711 travels via a vertical scanning device and a projection optical system to reach a screen, as does that in the arrangement shown in FIG. 2A.

In this embodiments the LED arrays 701, 703, and 705 for display in three colors are used to form a multicolor image. The color light source has arrayed elements each having a limited optical output level, such that even if LEDs having an optical output of several mW or less, sufficiently high screen brightness can be obtained.

The operation of the optical system shown in FIG. 12 will be briefly described. Light beams emitted from the LEDs 701a and so on in the LED arrays 701, 703, and 705 are color-mixed by the combining optical system 707, travel through the collimator lens 709, and strike the horizontal scanning device 711. At this time, the light beams from the LEDs 701*a*, 703*a*, and 705*a* are color-mixed to form a color-mixed light beam 713*a*. Similarly, color-mixed light beams 713*b* and 713*c* are formed.

The color-mixed light beams 713*a*, 713*b*, and 713*c* are made to scan by the horizontal scanning device 711 to form scanning beams 715*a*, 715*b*, and 715*c*, which travel through the projection optical system to reach the screen. On the screen, three scanning lines are formed by the color-mixed light beams 713*a*, 713*b*, and 713*c* . The LED arrays in the light sources 701, 703, and 705 are placed so that the scanning lines strike the same point at different times suitably shifted. The placement of the LED arrays is performed in the same manner as that in the Embodiment 1 or 2.

The display apparatus is thus arranged to enable a color image in VGA format having sufficiently high screen brightness even if LEDs having a lower optical output level are used as light sources.

While various embodiments of the present invention have been described, an amplitude modulation method other than the modulation methods in the described embodiments may used for the light source. A method in which some of the above-described modulation methods are combined may also be used.

The placement of the light emitting devices is not limited to those described above. The light emitting devices may be placed in any other way if the scanning lines can be superposed by horizontal scanning and vertical scanning.

The light emitting device is not limited to the semiconductor light emitting device. A gas laser or a semiconductor laser-excited solid-state layer may also be used. If such a device is used, modulation may be performed by using an external modulator such as an acoustooptical modulator.

The size of images to be displayed may be selected as desired according to one's use. For example, a size of 10 to 15 inches may suffice for display on a computer display or a personal television display. In the case of display for a conference in which a large number of people participate, the screen size may be set to a comparatively large size, e.g., a size of 50 inches or larger. The power of the projection optical system, the optical output of the light source, and the number of light source arrays may be set according to the screen size and brightness.

According to the present invention, as described above, the scanning lines are superposed on the screen, so that the screen brightness can be improved even if a light source lower in optical output is used.

What is claimed is:

1. An image display apparatus, comprising:
a light source having a plurality of light emitting devices; and
a projection optical system capable of making lights from said light source scan in a main scanning direction and in a subscanning direction to display on a screen an image having a predetermined number of pixels,
wherein scanning lines in the main scanning direction formed by the lights emitted from each of said light emitting devices are controlled to be superposed one on another on the screen, and
wherein said light emitting devices are arranged in a direction not parallel to each of a direction corresponding to main scanning and a direction corresponding to subscanning, and the distance between said light emitting devices in the direction corresponding to subscanning is equal to a distance determined on the basis of a pixel pitch in the subscanning direction.

* * * * *

UNITED STATES PATENT AND TRADEMARK OFFICE
CERTIFICATE OF CORRECTION

PATENT NO. : 6,972,737 B2  Page 1 of 1
APPLICATION NO. : 10/152683
DATED : December 6, 2005
INVENTOR(S) : Yukio Furukawa et al.

It is certified that error appears in the above-identified patent and that said Letters Patent is hereby corrected as shown below:

COLUMN 2:

Line 27, "attaint" should read --attain--.

COLUMN 3:

Line 47, "relating to FIG. 3 are" should be deleted.
Line 48, "ON/OFF-modulated;" should be deleted.

Signed and Sealed this

Eighth Day of August, 2006

JON W. DUDAS
*Director of the United States Patent and Trademark Office*